(12) United States Patent
Finlayson

(10) Patent No.: US 9,532,498 B2
(45) Date of Patent: Jan. 3, 2017

(54) SEEDER WITH LOCKOUT CLUTCH

(71) Applicant: Great Plains Manufacturing, Inc., Salina, KS (US)

(72) Inventor: Keith W. Finlayson, Gypsum, KS (US)

(73) Assignee: Great Plains Manufacturing, Inc., Salina, KS (US)

(*) Notice: Subject to any disclaimer, the term of this patent is extended or adjusted under 35 U.S.C. 154(b) by 189 days.

(21) Appl. No.: 14/288,006

(22) Filed: May 27, 2014

(65) Prior Publication Data
US 2015/0342114 A1 Dec. 3, 2015

(51) Int. Cl.
| | |
|---|---|
| A01C 19/04 | (2006.01) |
| A01C 19/00 | (2006.01) |
| A01B 49/06 | (2006.01) |
| F16D 41/12 | (2006.01) |
| F16D 1/08 | (2006.01) |

(52) U.S. Cl.
CPC ............ *A01C 19/04* (2013.01); *A01B 49/06* (2013.01); *F16D 41/12* (2013.01); *A01C 19/00* (2013.01); *F16D 1/0876* (2013.01)

(58) Field of Classification Search
CPC ......... A01C 19/04; A01C 19/00; A01B 49/06; A01B 49/04; A01B 49/00; F16D 41/00; F16D 48/00; F16D 41/12
See application file for complete search history.

(56) References Cited

U.S. PATENT DOCUMENTS

| | | |
|---|---|---|
| 3,557,922 A | 1/1971 | Schwerdhoffer |
| 2002/0108546 A1* | 8/2002 | Audigie ................. A01C 19/00 111/178 |

* cited by examiner

*Primary Examiner* — Christopher J Novosad
(74) *Attorney, Agent, or Firm* — Hovey Williams LLP

(57) ABSTRACT

A seed planting machine for dispensing seed. The seed planting machine includes a transmission with a lockout clutch having an actuator for shifting the lockout clutch between a first configuration and a second configuration. As such, the lockout clutch, in the first configuration, is operable to cause the seed planting machine to dispense seed in response to a roller mechanism of the seed planting machine rotating in a first direction and to not dispense seed in response to the roller mechanism rotating in a second direction. Furthermore, the lockout clutch, in the second configuration, is not operable to cause the seed planting machine to dispense seed in response to the roller mechanism rotating in either the first or second directions.

13 Claims, 10 Drawing Sheets

# SEEDER WITH LOCKOUT CLUTCH

FIELD OF THE INVENTION

Embodiments of the present invention are direct generally to a lockout clutch. More particularly, embodiments of the present invention relate to a lockout clutch for use on an agricultural seed planting machine.

BACKGROUND OF THE INVENTION

Currently-used agricultural seeding machines implement various types of transmission systems operable to transmit power and/or rotation to components of the machines so as to facilitate the dispensing of seed from the machines. In particular, the machines will often include chain-driven transmission systems that are operable to drive seed dispensing mechanisms associated with the machines. Such transmission systems are often powered by rotating components of the machines, such as the machines' wheels, rollers, or the like. During use of the seeding machines, the rotating components generally rotate in response to the movement of the machines. For example, if a seeding machine travels in a first direction, the rotating components will similarly rotate in a first direction. Alternatively, if the seeding machine travels in a second direction, the rotating components will similarly rotate in a second direction. Because the seed dispensing mechanisms of the seeding machines are directly linked to the rotating components via the transmission systems, the seed dispensing mechanisms will be driven regardless of the direction in which the seeding machines are moving.

However, many seed dispensing mechanisms can be damaged if they are driven in a particular direction. For example, fluted meter-type seed dispensing mechanisms are generally only operable to rotate in a certain first direction and become inoperable and/or damaged if caused to rotate in a second direction. As such, because the seed dispensing mechanisms are driven by the transmission systems of the seeding machines, the seed dispensing mechanisms can be damaged when the seeding machines are travelling in a particular direction (e.g., reverse). Furthermore, it is often desired or necessary to move the seeding machines in multiple directions without the seed dispensing mechanisms of the seeding machines dispensing seed at all. For example, it may be necessary to use the seeding machines to till or otherwise condition the soil before dispensing seed into the soil. As such, it may be necessary to cause the seeding machines to move in all directions for a time without dispensing seed.

In the past, it was only possible to disengage the seed dispensing mechanism of a seeding machine by having a user physically remove a pin from a sprocket assembly within the transmission system of the seeding machine. Upon removing the pin, the seed dispensing mechanism could not be driven in either direction. Once the user no longer required the seed dispensing mechanism to be disengaged, the user was required to re-align and re-insert the pin. Such actions were difficult, time-consuming, and often times dangerous.

SUMMARY OF THE INVENTION

In one embodiment of the present invention, there is provided a seed planting machine comprising: a seed bin; a rotatable seed dispensing mechanism for dispensing seed from the seed bin; a ground-engaging roller mechanism; and a chain drive transmission system for selectively transmitting rotation from the ground-engaging roller mechanism to the seed dispensing mechanism. The seed planting machine provides for the transmission to include a lockout clutch with an actuator for shifting the lockout clutch between a first configuration and a second configuration. As such, the lockout clutch, in the first configuration, is operable to drive the seed dispensing mechanism in response to the roller mechanism rotating in a first direction, and is not operable to drive the seed dispensing mechanism in response to the roller mechanism rotating in a second direction. Furthermore, the lockout clutch, in the second configuration, is not operable to drive the seed dispensing mechanism in response to the roller mechanism rotating in the first direction, and is not operable to drive the seed dispensing mechanism in response to the roller mechanism rotating in the second direction.

In another embodiment of the present invention, there is provided a method for planting seeds with a planter, with the planter having a lockout clutch with an actuator for shifting the planter between a first configuration and a second configuration. The method includes the first step of engaging the actuator of the lockout clutch to configure the planter in the first configuration. The next step includes travelling in a first direction using the planter configured in the first configuration, such that the lockout clutch transmits rotational motion and the planter dispenses seeds. The next step includes travelling in a second direction using the planter configured in the first configuration, such that the lockout clutch does not transmit rotational motion and the planter does not dispense seeds. In a next step, the actuator of the lockout clutch is disengaged to configure the planter in the second configuration. Thereafter, the next step includes travelling in the first direction using the planter configured in the second configuration, such that the lockout clutch does not transmit rotational motion and the planter does not dispense seeds. Finally, the last step includes travelling in the second direction using the planter configured in the second configuration, such that the lockout clutch does not transmit rotational motion and the planter does not dispense seeds.

In yet another embodiment of the present invention, there is provided a lockout clutch assembly comprising: an axle; a drive sprocket rotatably mounted on the axle; a driven sprocket rotatably mounted on the axle; and an actuator for shifting the lockout clutch assembly between a first configuration and a second configuration. As such, and with the lockout clutch assembly in the first configuration, a rotation of the drive sprocket in a first direction is operable to cause a corresponding rotation of the driven sprocket in the first direction. Contrastingly, a rotation of the drive sprocket in a second direction is not operable to cause a corresponding rotation of the driven sprocket in the second direction. With the lockout clutch assembly in the second configuration, a rotation of the drive sprocket in the first direction is not operable to cause a corresponding rotation of the driven sprocket in the first direction. Similarly, a rotation of the drive sprocket in the second direction is not operable to cause a corresponding rotation of the driven sprocket in the second direction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 2:
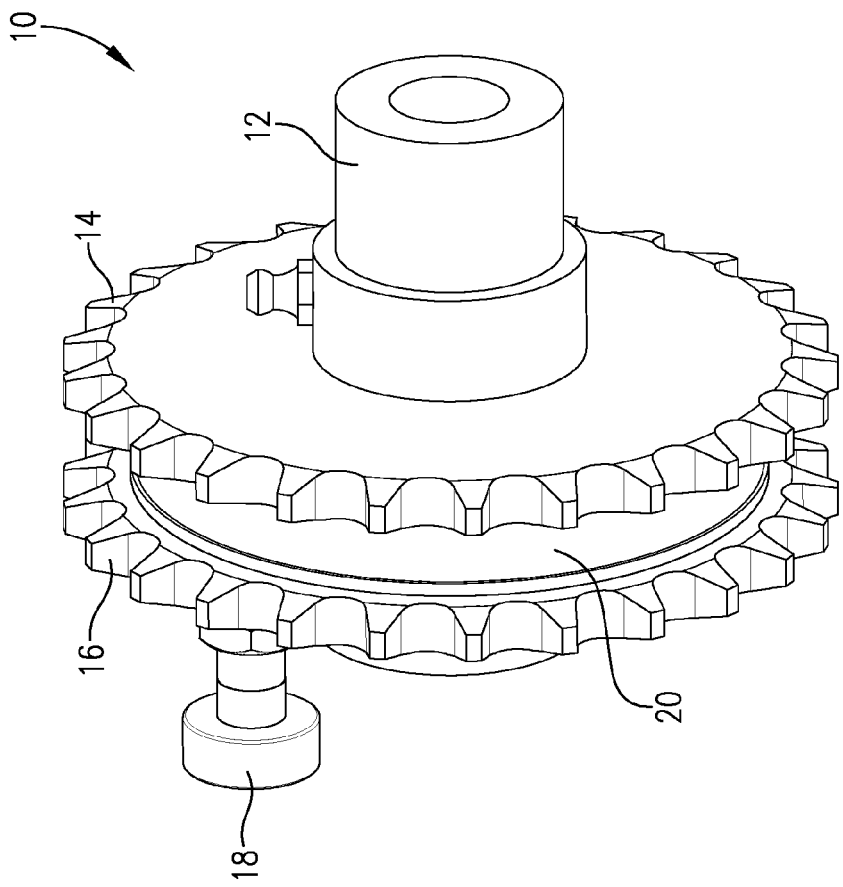
FIG. 2 is a side, rear perspective view of the lockout clutch of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
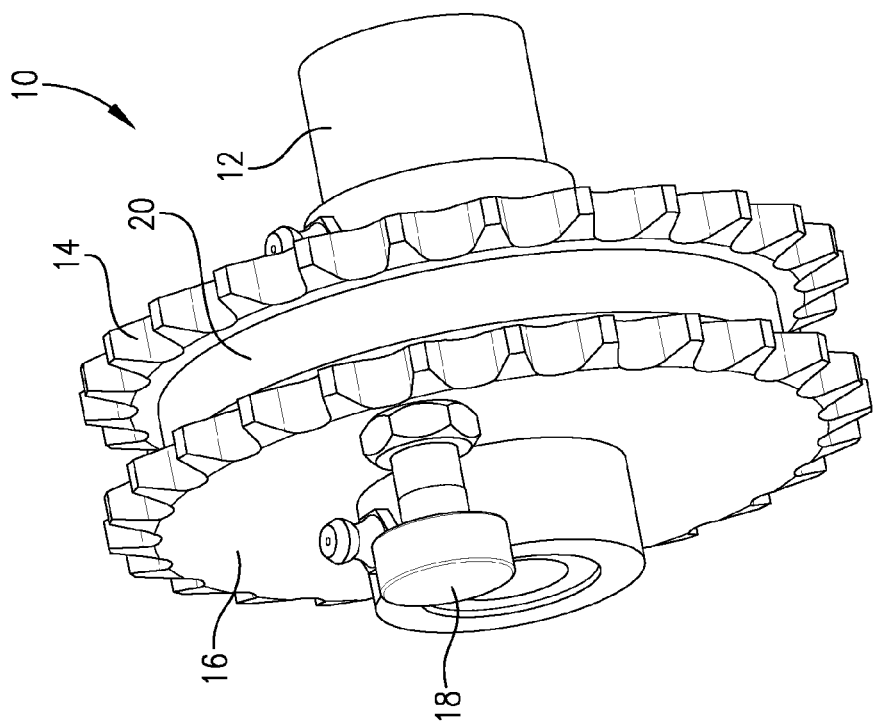
FIG. 1 is a side, front perspective view of a lockout clutch of embodiments of the present invention.

FIGS. 1 and 2 depict a lockout clutch assembly 10 according to embodiments of the present invention. The lockout clutch assembly 10 includes an axle 12, a drive sprocket 14 rotatably mounted on the axle, a driven sprocket 16 rotatably mounted on the axle, and an actuator 18 received within the driven sprocket. The actuator is operable to shift the lockout clutch assembly between a first configuration and a second configuration. In certain embodiments, the lockout clutch assembly will further include a catch plate 20 rotatably mounted on the axle 12 between the drive sprocket 14 and the driven sprocket 16. In such embodiments, each of the drive sprocket 14, driven sprocket 16, and catch plate 20 are generally capable of independent rotation about the axle 12. The lockout clutch assembly 10 may be formed from various types of high-strength material, such as iron, steel, carbon fiber, high-strength polymers, or the like, and/or combinations thereof.

Figure 3:
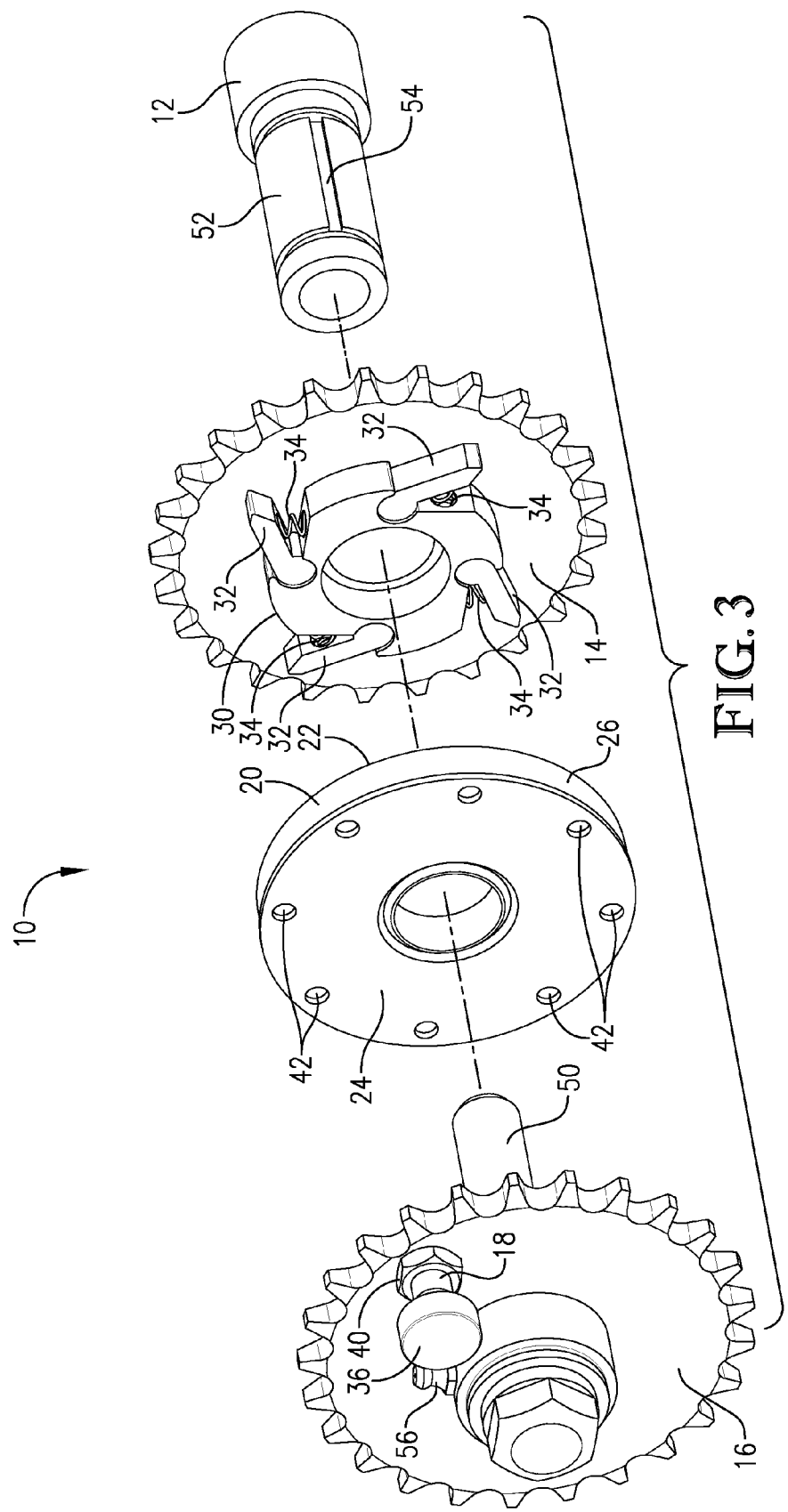
FIG. 3 is a side, front exploded view of the lockout clutch of FIGS. 1-2, illustrating an axle, a drive sprocket, a catch plate, and a driven sprocket of the lockout clutch.
Figure 4:
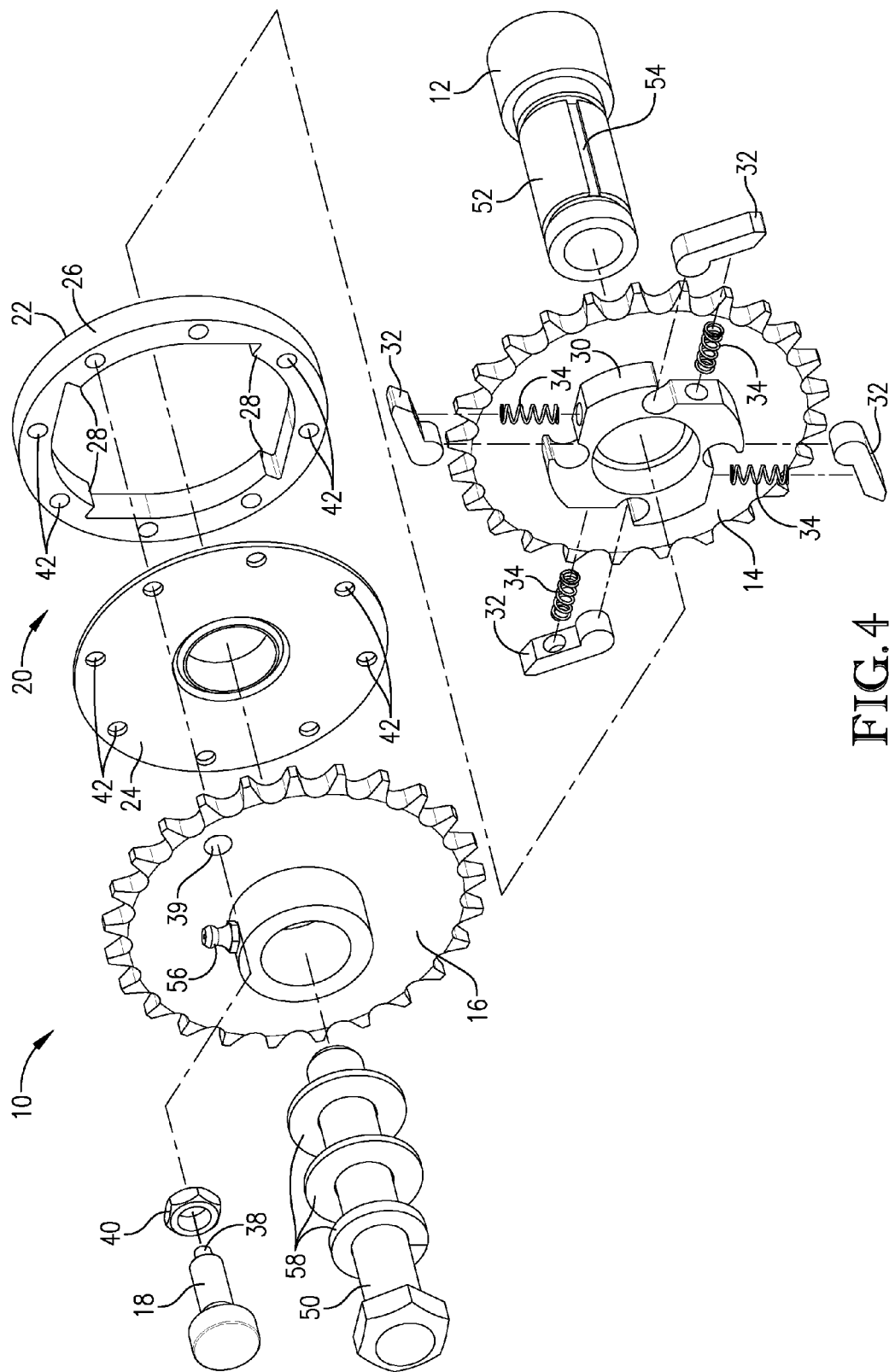
FIG. 4 is an additional side, front exploded view of the lockout clutch of FIGS. 1-3, with a portion of the axle and the drive sprocket disposed adjacently to the side of remaining portions of the lockout clutch.
Figure 5:
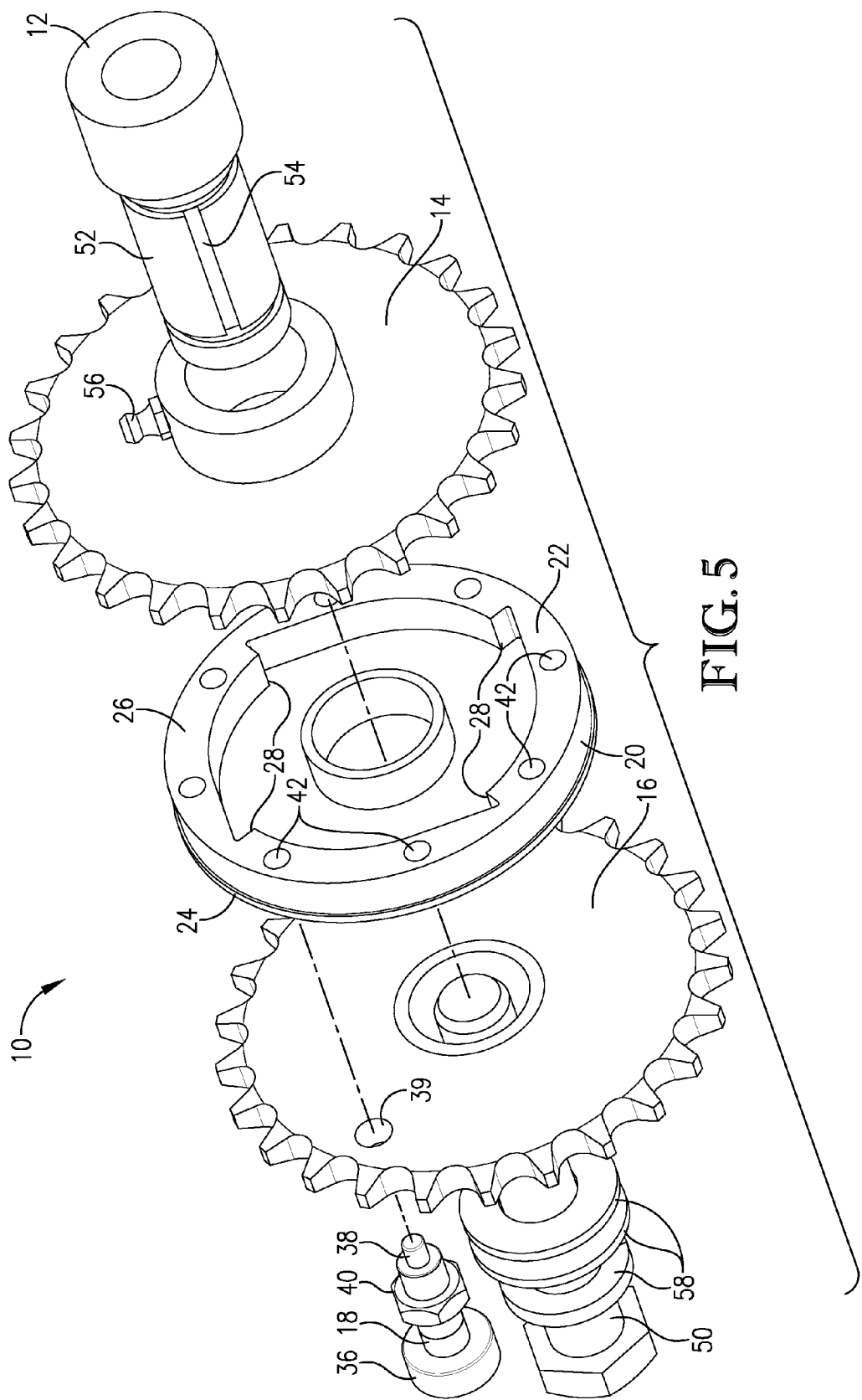
FIG. 5 is a side, rear exploded view of the lockout clutch of FIGS. 1-4.

With reference to FIGS. 3-5, the catch plate 20 includes an interior side 22 and an exterior side 24, with the interior side 22 facing the drive sprocket 14 and the exterior side 24 facing the driven sprocket 16. As shown on FIGS. 4-5, the interior side 22 of the catch plate 20 includes a circular ring projection 26 that extends around a circumference of the interior side. Embodiments of the present invention may provide for the circular ring projection 26 to be integral with the catch plate 20, such that FIG. 4 is illustrative of an exploded view of the catch plate 20 with the circular ring projection 26 separated from remaining portions of the catch plate 20. With reference to FIGS. 4-5, the circular ring projection 26 includes a radially inwardly facing surface having a plurality of ratchet teeth 28 formed thereon.

With reference to FIGS. 3-4, the drive sprocket 14 includes a central projection 30 having a plurality of pawls 32 rotatable mounted therein. The pawls 32 are securely mounted on the drive sprocket 14, such that a rotation of the drive sprocket 14 will cause a corresponding rotation of the pawls 32. The central projection 30 additionally includes a plurality of springs 34 extending radially outward from the central projection 30 and engaging the pawls 32. As such, the springs 34 are operable to bias an end of the pawls 32 in a position rotated away from the central projection 30. The pawls 32 are, therefore, biased such that the ends of the pawls 32 are operable to be generally engaged with the ratchet teeth 28 of said catch plate 20, as will be discussed below with reference to FIGS. 6-8.

Figure 8:
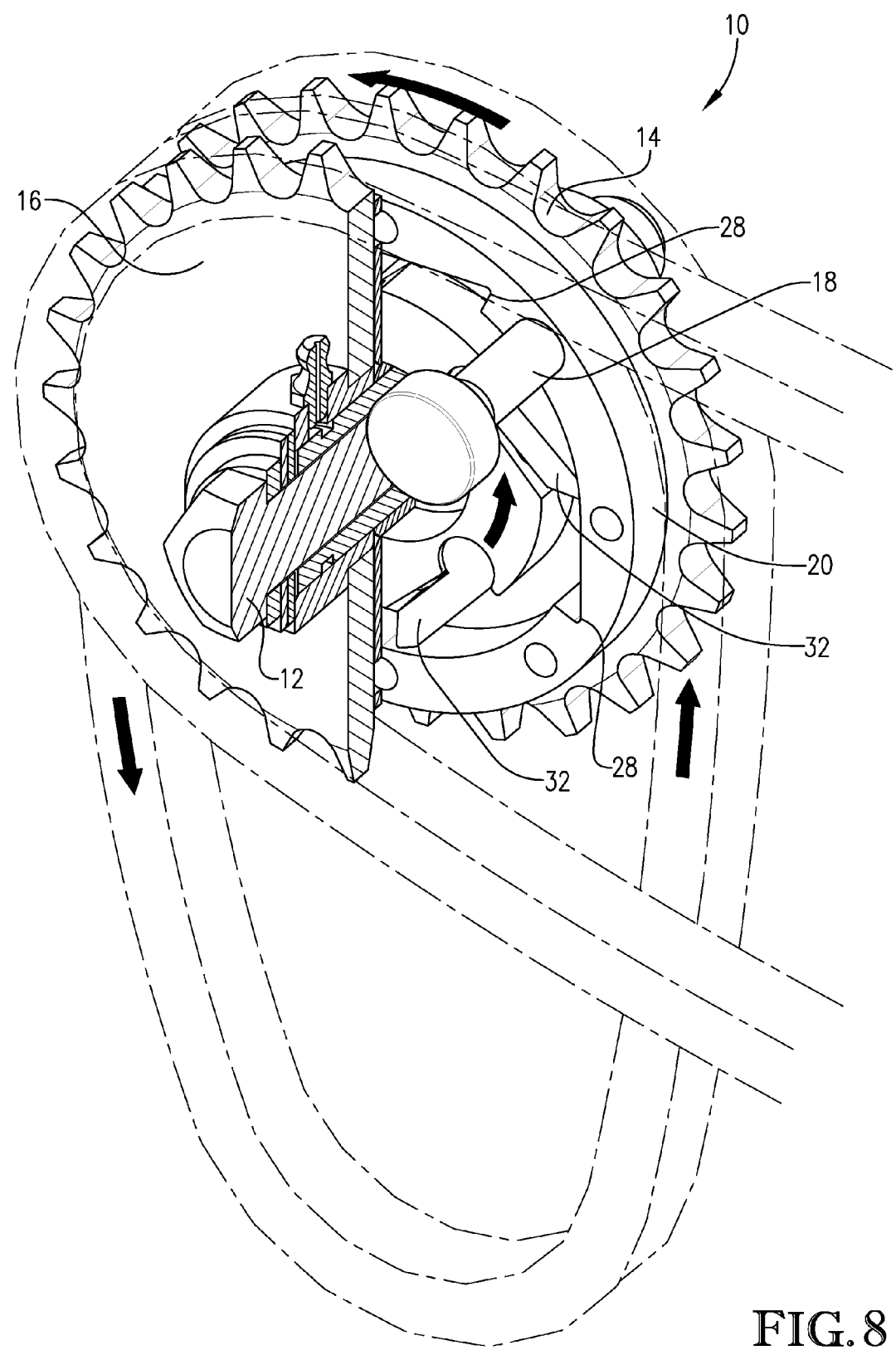
FIG. 8 is a partial view of the lockout clutch of FIGS. 1-7 being configured in the first configuration and having the drive sprocket rotated in the second direction by its associated drive chain, with the driven sprocket and its associated drive chain not being driven in the second direction, and with the driven sprocket, the axle, and portions of the catch plate being shown in partial view.

For example, when the drive sprocket 14 is rotated in a first direction, such as clockwise as shown in FIG. 8, the pawls 32 will similarly rotate clockwise. With the pawls 32 engaged with the teeth 28 of the catch plate 20, the pawls 32 are operable to drive the catch plate 20 in the clockwise direction. Contrastingly, when the drive sprocket 14 is rotated in a second direction, such as counterclockwise in FIG. 8, the pawls 32 will similarly rotate counterclockwise. However, the pawls 32 do not engage with the teeth 28 of the catch plate 20 when rotated in the counterclockwise direction. Instead, the pawls 32 will freely rotate about the interior of the circular ring projection 26 of the catch plate 20. The pawls 32 will continually pass by each of the teeth 28, without engagement with the teeth 28, when rotating in the counterclockwise direction. As such, the catch plate 20 will not be caused to rotate by the drive sprocket 14 and its pawls 32.

Returning to FIGS. 3-5, the actuator 18 generally comprises a longitudinal shaft having first and second ends. The first end of the actuator 18 may include a handle portion 36 with a diameter generally greater than a diameter of a main central portion of the actuator 18. The second end of the actuator 18 may include a projection 38 with a diameter generally less than a diameter of the main central portion. The actuator 18 is coupled within the driven sprocket 16 via an opening 39 extending through the driven sprocket 16. The opening 39 is sized such that the actuator 18 is capable of translating through the opening 39. In some embodiments, the actuator 18 may include a restricting mechanism 40, such as a restricting nut, that prevents the actuator 18 from being completely removed from the opening 39 of the driven sprocket 16.

Remaining with FIG. 3-5, the catch plate 20 includes a plurality of openings 42 circumferentially-positioned on its exterior side 24 and extending through to its interior side 22. In some embodiments, the openings 42 extend through an entire thickness of the catch plate 20, including the circular ring projection 26. However, in other embodiments, the openings 42 may only extend from the exterior side 24 of the catch plate 20 through a portion of the thickness of the catch plate. Nevertheless, the openings 42 are sized so as to be operable to receive at least a portion of the actuator 18. For instance, in some embodiments, each of the openings 42 is capable of receiving the projection 38 of the actuator 18, such that the actuator 18 is operable to engage with the catch plate 20.

The axle 12 may comprise a central pin 50 surrounded by a bushing sleeve 52. In some embodiments, the drive sprocket 14, the driven sprocket 16, and the catch plate 20 may be rotatably secured around an exterior of the bushing sleeve 52. In some embodiments, bushing sleeve 52 may include one or more grease channels 54 formed on its outer surface. Furthermore, the axle 12 may be associated with one or more grease fittings 56 positioned around the bushing sleeve 52 in fluid communication with the grease channels 54. As such, grease may be introduced to the axle 12 via the grease fittings 56 and into the grease channels 54. The grease in the grease channels 54 is operable to reduce rotational friction between the axle 12 and the drive sprocket 14, the driven sprocket 16, and the catch plate 20. In some additional embodiments, the axle 12 may also be associated with one or more washer elements 58 for enhancing load distribution and for securing the drive sprocket 14, the driven sprocket 16, and the catch plate 20 about the axle 12.

Figure 6:
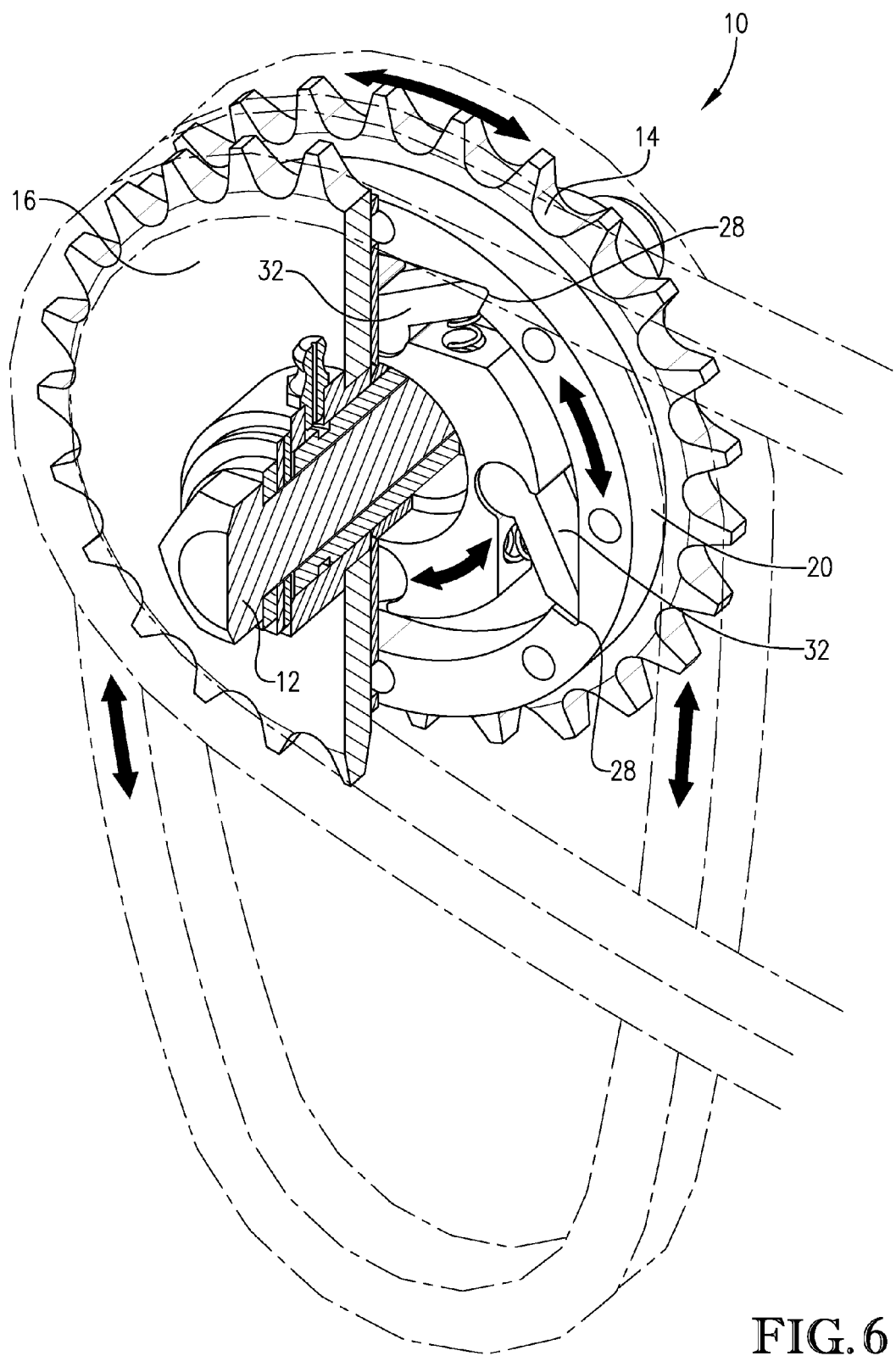
FIG. 6 is a partial view of the lockout clutch of FIGS. 1-5 being configured in a second configuration and illustrating the drive sprocket being rotated in either a first direction or a second direction by its associated drive chain, with the driven sprocket and its associated drive chain not being driven in either the first or second directions, and with the driven sprocket, the axle, and portions of the catch plate being shown in partial view.
Figure 7:
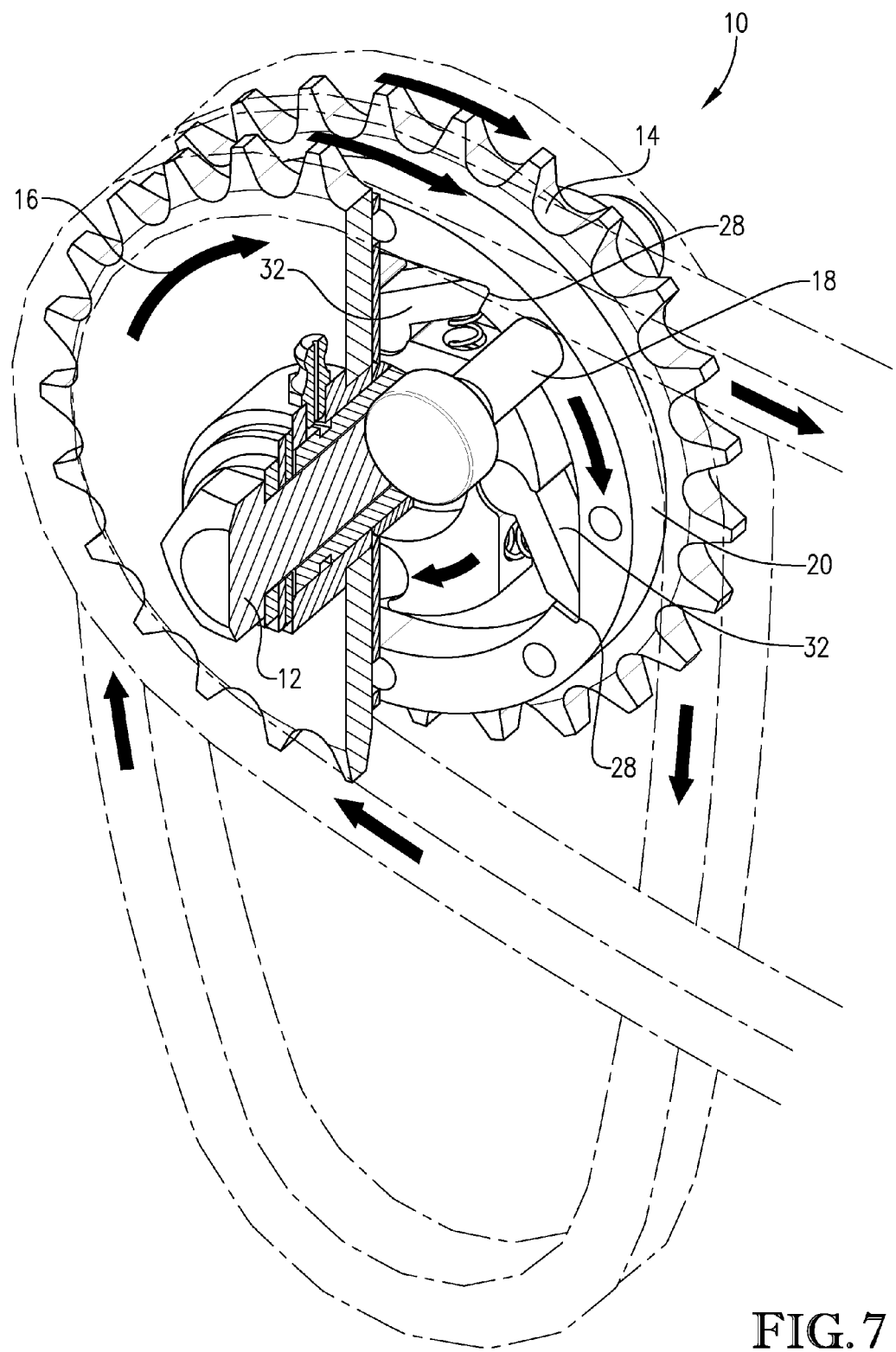
FIG. 7 is a partial view of the lockout clutch of FIGS. 1-6 being configured in a first configuration and having the drive sprocket rotated in the first direction by its associated drive chain, with the driven sprocket and its associated drive chain also being driven in the first direction, and with the driven sprocket, the axle, and portions of the catch plate being shown in partial view.

In operation, the lockout clutch assembly 10 is operable to be configured in at least two configurations. Specifically, with the actuator 18 engaged with the catch plate 20, the lockout clutch assembly 10 is in the first configuration. As such, and with reference to FIG. 7, when the drive sprocket 14 is rotated in the first direction (e.g., clockwise in FIG. 7), the catch plate 20 will similarly rotate in the first direction due to the engagement of the pawls 32 with the teeth 28, as previously described. Furthermore, with the actuator 18 engaged with the catch plate 20, the catch plate 20 is operable to drive the actuator 18. Because the actuator 18 is connected to the driven sprocket 16, via the opening 39, the driven sprocket 16 will similarly be driven to rotate in the first direction (e.g., clockwise in FIG. 7). Contrastingly, with reference to FIG. 8, when the drive sprocket 14 is rotated in a second direction (e.g., counterclockwise in FIG. 8), the pawls 32 will not engage with the teeth 28 of the catch plate 20, such that the catch plate 20 will not be caused to rotate, as was previously described. As such, even with the actuator 18 engaged with the catch plate 20, the driven sprocket 16 will not be caused to rotate in response to the drive sprocket 14 rotating in the second direction. With the actuator 18 not engaged with the catch plate 20, the lockout clutch assembly 10 is in the second configuration. In such a configuration, and as illustrated in FIG. 6 as previously described, when the drive sprocket 14 is rotated in either the first direction (e.g., clockwise in FIG. 6) or the second direction (e.g., counterclockwise in FIG. 6), the driven sprocket 16 will not be caused to rotate.

In certain alternative embodiments of the lockout clutch 10, the catch plate 20 may not be positioned between the drive sprocket 14 and the driven sprocket 16. In such embodiments, the catch plate 20 may be positioned on either side of the drive sprocket 14 or of the driven sprocket 16. In such instances, either the drive sprocket 14 or the driven sprocket 16 will be positioned between the catch plate 20 and the other of the drive sprocket 14 or the driven sprocket 16. Nevertheless, even in such configurations, the lock out clutch is operable to be selectively configured in either the first or second configurations, as previously described.

Embodiments of the present invention provide for the lockout clutch assembly 10, as described above, to be incorporated in a seed planting machine, such that the seed planting machine is operable to selectively dispense seeds based on a direction of travel of the machine. In more detail and with reference to FIG. 9, embodiments of the present invention include a seed planting machine 70 broadly comprising a seed bin 72 for housing seed, a rotatable seed dispensing mechanism 74 for dispensing seed from said seed bin, a ground-engaging roller mechanism 76, and a chain drive transmission system 78 for selectively transmitting rotation from said ground-engaging roller mechanism to said seed dispensing mechanism. In certain embodiments, the transmission system 78 will include the lockout clutch assembly 10. As described above, the lockout clutch assembly 10 is operable to shift between the first configuration and the second configuration, and as such, is operable to configure the seed planting machine 70 in either a first configuration or a second configuration. Furthermore, the transmission system 78 may include a plurality of sprockets, pulleys, gears, or other rotational mechanisms linked by chains, belts, or the like. As such, the transmission system 78 is capable of transmitting rotation from the ground-engaging mechanism 76 to a plurality of mechanisms on the seed planting machine 70.

Figure 10:
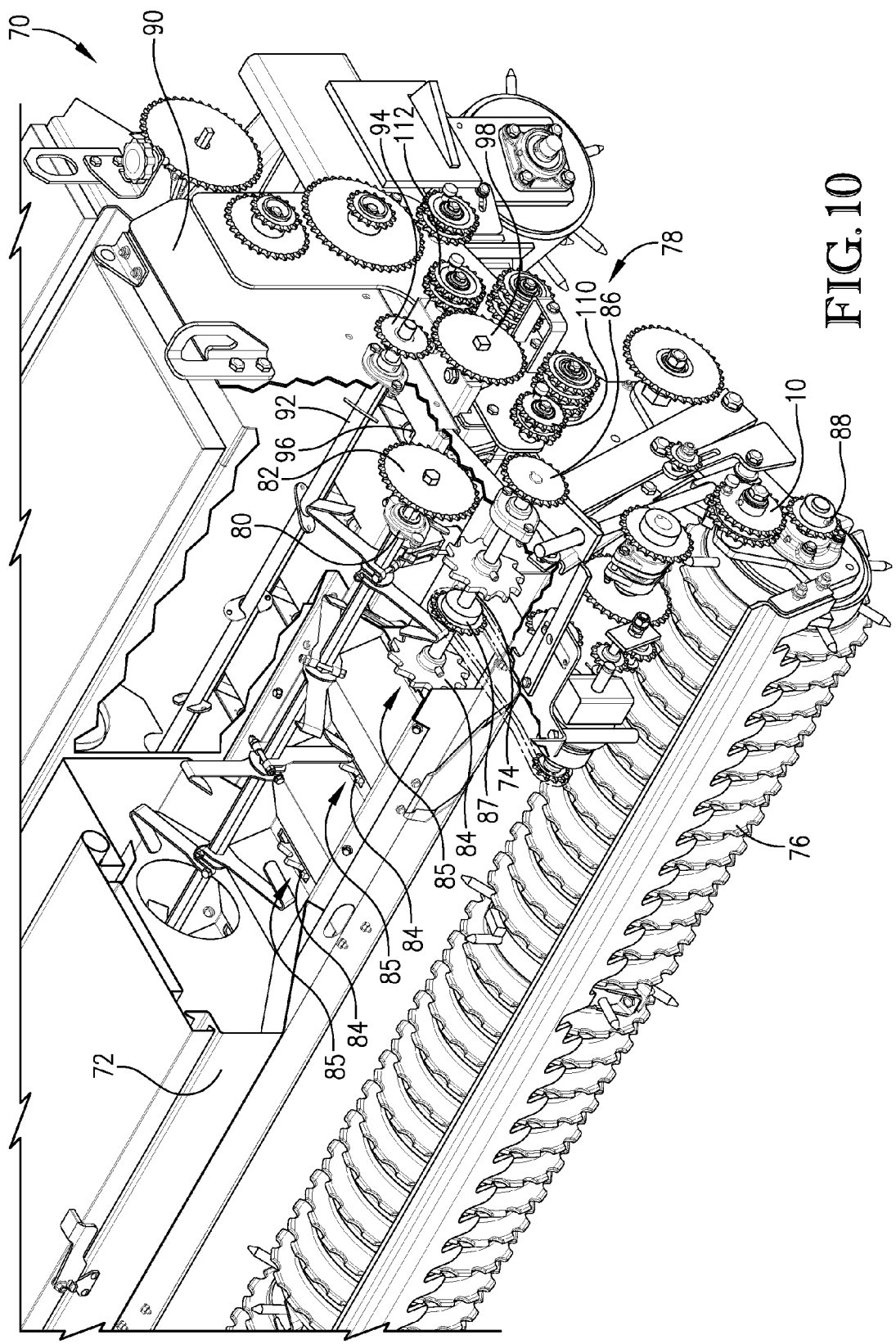
FIG. 10 is a side, rear partial view of the seed planting machine of FIG. 9, with a portion of a seed bin of the machine removed to illustrate a seed dispensing mechanism and a seed mixing mechanism within the seed bin.

In certain embodiments, the seed planting machine 70 will include only a single seed bin 72 for housing seed. As illustrated by FIG. 10, the seed bin 72 may include a mixing mechanism 80 comprising a paddle wheel, an auger agitator, mixing arms, or any otherwise generally elongated shaft having a plurality of mixing elements (e.g., agitators, paddles, or the like) extending radially therefrom. In operation, the mixing mechanism 80 is operable to be rotated within the seed bin 72, such that the mixing mechanism 80 continually mixes the seed within the seed bin, thereby keeping the seed from clumping together (i.e., coagulating), keeping the seed from bridging within the seed bin 72, and generally keeping a consistent flow of seed to the seed dispensing mechanism 74. In some embodiments, the mixing mechanism 80 will include a drive component 82, such as a sprocket, pulley, or a gear, which is operable to drive the mixing mechanism 80 and which is integrally connected with an end of the mixing mechanism 80. The drive component 82 is integrally connected to the mixing mechanism 80, such that a rotation of the drive component 82 causes a corresponding rotation of the mixing mechanism 80.

The seed dispensing mechanism 74 will generally be positioned adjacent to a lower portion and/or below the seed bin 72 and will extend across a length of the seed bin. In some embodiments, as illustrated in FIG. 10, the seed dispensing mechanism 74 will comprise a fluted roller and/or a metering sprocket 84 housed within a seed cup 85. In further embodiments, the seed dispensing mechanism 74 may alternatively comprise metering belts, metering discs, metering augers, or the like. Regardless, in some embodiments, the seed dispensing mechanism 74 will include a plurality of interconnected fluted rollers/metering sprockets 84, each being housed within a seed cup 85. As such, the seed contained within the seed bin 72 is operable to be gravity fed into the seed cups 85 and precisely dispensed to the ground via the fluted rollers/metering sprockets 84. In such embodiments, the fluted rollers/metering sprockets 84 are interconnected via a shaft, such that the fluted rollers/metering sprockets 84 will each rotate at a common speed. As the fluted rollers/metering sprockets 84 rotate, they are operable to dispense seed from the seed bin 72 to the ground. In some embodiments, the seed dispensing mechanism 74 will be rotated via a drive component 86, such as a sprocket, pulley, or a gear, which is integrally connected with an end of the seed dispensing mechanism 74. In other embodiments, the seed dispensing mechanism 74 will be rotated via a drive component 87 (See FIG. 10) positioned at a location along a length of the seed dispensing mechanism 74. Regardless, the drive component (86 or 87) is integrally connected to the seed dispensing mechanism 74, such that a rotation of the drive component (86 or 87) causes a corresponding rotation of the seed dispensing mechanism 74.

Figure 9:
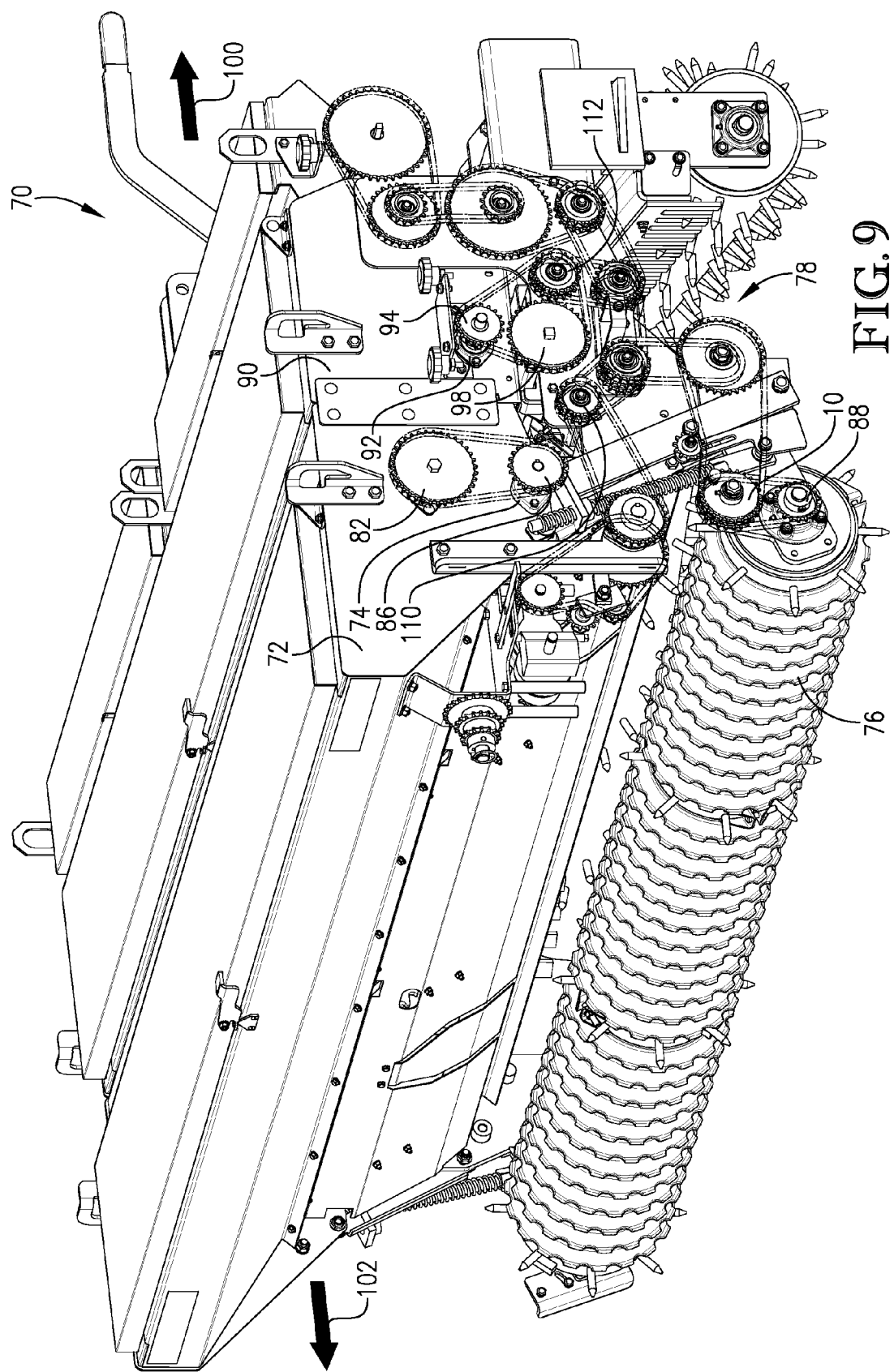
FIG. 9 is a side, rear perspective view of a seed planting machine according to embodiments of the present invention, with the seed planting machine including the lockout clutch of FIGS. 1-8.

Embodiments of the present invention provide for the ground-engaging roller mechanism 76 to comprise various types of rolling mechanisms. For example, the ground-engaging mechanism 76 may include an extended spiked roller, a packer roller, an aerator, disc harrows, or the like. In other embodiments, the ground-engaging mechanism 76 may simply include one or more of the wheels of the seed planting machine 70. In some embodiments, such as illustrated in FIGS. 9-10, the ground-engaging mechanism 76 will be positioned at a rear of the seed planting machine 70. In other embodiments, the ground-engaging mechanism 76 may be positioned at front, or at a position between the front and rear, of the seed planting machine 70. Nevertheless, the ground-engaging mechanism 76 will include a driven component 88, such as a sprocket, pulley, or a gear, which is integrally connected with an end of the ground-engaging mechanism 76. The driven component 88 is integrally connected, such that a rotation of the ground-engaging mechanism 76 causes a corresponding rotation of the driven component 88.

As such, the ground-engaging mechanism 76 is configured to rotate when the seed planting machine 70 is in motion. For example, and with reference to FIG. 9 in which the ground-engaging mechanism 76 is positioned adjacent to the rear of the seed planting machine 70, when the seed planting machine 70 is moving forward (as indicated by Arrow 100), the ground-engaging mechanism 76 will correspondingly rotate in a first direction (i.e., clockwise when viewing a right side of the seed planting machine 70, as in FIGS. 9-10). Alternatively, when the seed planting machine 70 is moving in a reverse direction (as indicated by Arrow 102), the ground-engaging mechanism 76 will correspondingly rotate in a second direction (i.e., counterclockwise when viewing the right side of the seed planting machine 70, as in FIGS. 9-10). Furthermore, because the driven component 88 correspondingly rotates with the ground-engaging mechanism 76, the driven component 88 will similarly rotate in the first direction (i.e., clockwise) when the seed planting machine 70 is moving in the forward direction and will rotate in the second direction (i.e., counterclockwise) when the seed planting machine 70 is moving in the reverse direction.

The chain drive transmission system 78 is operable to selectively transmit rotation from the ground-engaging mechanism 76 to the seed dispensing mechanism 74. In some embodiments, the transmission system 78 will include the lockout clutch 10, one or more sprockets/sprocket assemblies, and one or more chains operable to interconnect the one or more sprocket/sprocket assemblies, the lockout clutch 10, and the drive/driven components of the seed planting machine 70 (e.g., drive/driven components 82, 86, 88). As such, the chains are operable to transmit rotation between the lockout clutch 10 and the one or more sprockets/sprocket assemblies of the transmission system 78, and to/from the drive/driven components of the mixing mechanism 80, the seed dispensing mechanism 74, and the ground-engaging mechanism 76 of the seed planting machine 70 (e.g., via drive/driven components 82, 86, 88).

For example, and with reference to FIGS. 9 and 10, the driven component 88 of the ground-engaging mechanism 76 may be linked with the lockout clutch 10 via a first chain. In particular, the first chain may be engaged with the drive sprocket 14 of the lockout clutch 10. Furthermore, the drive component (86 or 87) of the seed dispensing mechanism 74 may be linked with the lockout clutch 10 directly or indirectly via a one or more additional chains and sprockets/sprocket assemblies of the transmission system 78. For example, a second chain may be engaged with the driven sprocket 16 of the lockout clutch 10 may be directly connected with the drive component (86 or 87) of the seed dispensing mechanism 74 via a second chain. However, it is understood that in certain embodiments, such as shown in FIGS. 9-10, the drive component (86 or 87) of the seed dispensing mechanism 74 and the lockout clutch 10 may not be directly linked via the second chain, but instead, may be indirectly linked via one or more sprockets/sprocket assemblies and/or chains of the transmission system 78.

Nevertheless, and regardless of whether the seed dispensing mechanism 74 is directly or indirectly connected with the lockout clutch 10, a rotation of the ground-engaging mechanism 76 will cause a corresponding rotation of the driven component 88, which will cause the first chain to translate, thereby causing a corresponding rotation of the drive sprocket 14 of the lockout clutch 10. Thus, a rotation of the ground-engaging mechanism 76 in a first direction will cause a corresponding rotation of the drive sprocket 14 of the lockout clutch 10 in the first direction, and a rotation of the ground-engaging mechanism 76 in a second direction will cause a corresponding rotation of the drive sprocket 14 of the lockout clutch 10 in the second direction. As previously described, with the lockout clutch in the first configuration (i.e., with the actuator 18 engaged with the catch plate 20), a rotation of the drive sprocket 14 in the first direction will cause a corresponding rotation of the driven sprocket 16 in the first direction. Contrastingly, a rotation of the drive sprocket 14 in the second direction will not cause a corresponding rotation of the driven sprocket 16 in the second direction. Because the driven sprocket 16 is linked with the drive component (86 or 87) of the seed dispensing mechanism 74, either directly or indirectly, a rotation of the driven sprocket 16 will cause a corresponding rotation of the seed dispensing mechanism 74 and, thus, will result in the seed planting machine 70 dispensing seed from the seed bin 72.

In view of the above, and particularly with the lockout clutch 10 in the first configuration, when the seed planting machine 70 travels in a first direction, the ground-engaging mechanism 76 will rotate in the first direction. As a result, the driven component 88 of the ground-engaging mechanism, the first chain, the drive sprocket 14 of the lockout clutch 10, the driven sprocket 16 of the lockout clutch 10, portions of the transmission system 78, and the drive component (86 or 87) of the seed dispensing mechanism 74 will all rotate in the first direction. The end result being that the seed dispensing mechanism 74 will rotate and dispense seed. Contrastingly, when the seed planting machine 70 travels in the second direction, the ground-engaging mechanism 76 will rotate in the second direction. As a result, and with the lockout clutch 10 in the first configuration, only the driven component 88 of the ground-engaging mechanism 76, the first chain, and the drive sprocket 14 of the lockout clutch 10 will rotate in the second direction. The driven sprocket 16, the transmission system 78, the drive component (86 or 87), and the seed dispensing mechanism 74 will not be caused to rotate. The end result being that the seed dispensing mechanism 74 will not dispense seeds. In some embodiments, the first direction that the seed planting machine 70 travels will be a forward direction, and the second direction that the seed planting machine 70 travels will be a reverse direction. Thus, with the seed planting machine 70 configured in the first configuration, when the seed planting machine 70 travels forward, it is operable to dispense seeds. However, when the seed planting machine 70 travels in reverse, it is not operable to dispense seeds.

With the lockout clutch 10 in the second configuration, the actuator 18 is not engaged with the catch plate 20, such that the driven sprocket 16 will not be caused to rotate in response to the drive sprocket 14 being rotated in either the first or second direction. As such, with the seed planting machine 70 configured in the second configuration, when the seed planting machine 70 travels in either the first or second directions, the ground-engaging mechanism 76 will rotate in the first or second directions, respectively, but only the driven component 88 of the ground-engaging mechanism 76, the first chain, and the drive sprocket 14 of the lockout clutch 10 will be correspondingly caused to rotate in the first or second directions. The driven sprocket 16, the drive component (86 or 87), and the seed dispensing mechanism 74 will not be caused to rotate, such that the seed dispensing mechanism 74 will not dispense seeds. Thus, with the seed planting machine 70 configured in the second configuration, when the seed planting machine 70 travels forward or reverse, it is not operable to dispense seeds.

Figure 11:
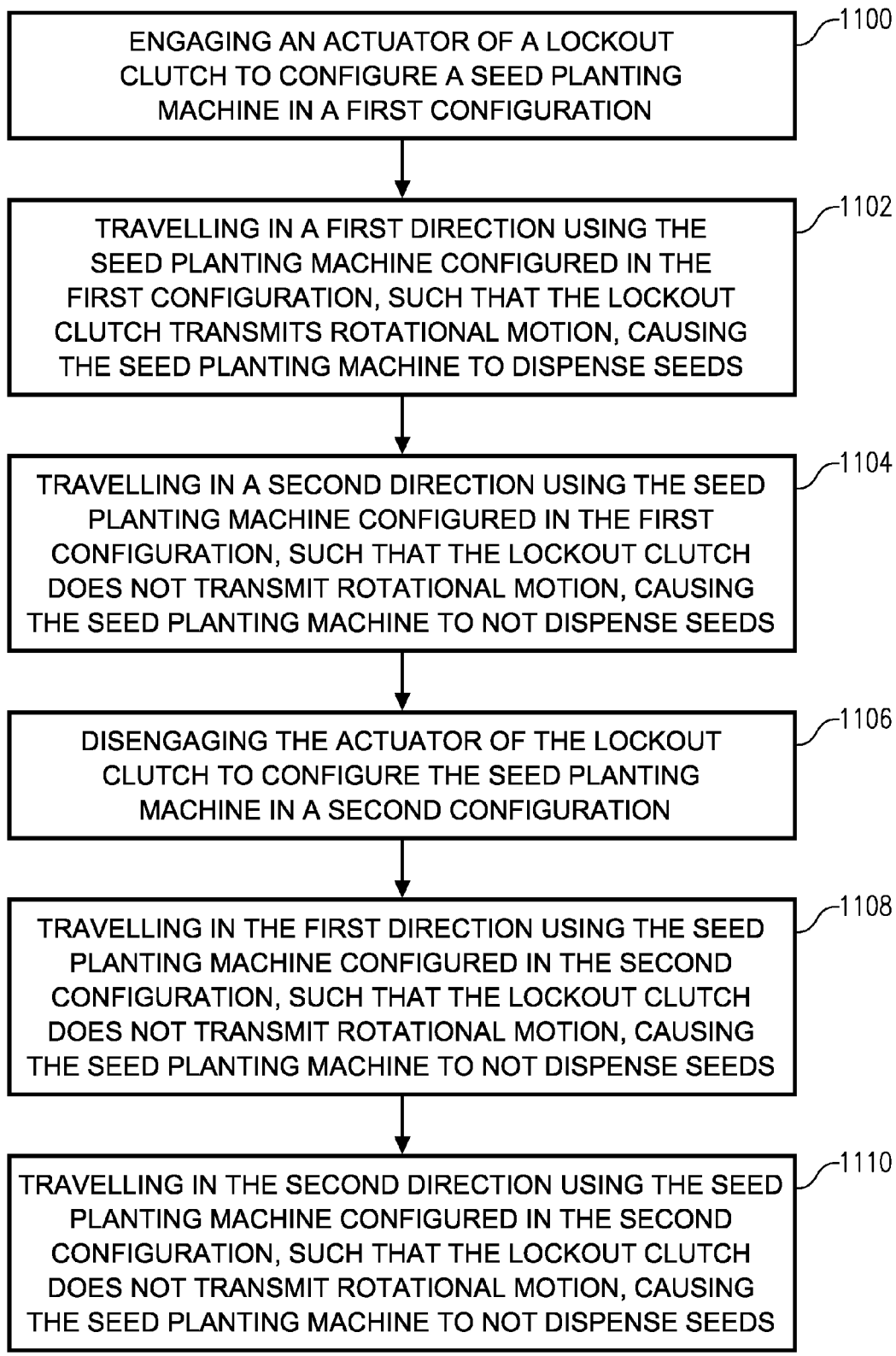
FIG. 11 is a flow chart of a method for planting seed with a seed planting machine according to embodiments of the present invention.

As such, embodiments of the present invention include a method for planting seed with a seed planting machine. In particular, the method includes a seed planting machine, such as illustrated by seed planting machine 70 of FIGS. 9-10, having the lockout clutch 10 with the actuator 18 for shifting the seed planting machine 70 between a first configuration and a second configuration. In more detail, and with reference to FIG. 11, the method includes the initial Step 1100 of engaging the actuator 18 of the lockout clutch 10 to configure the seed planting machine 70 in the first configuration. The next Step 1102 includes travelling in a first direction using the seed planting machine 70 configured in the first configuration, such that the lockout clutch 10 transmits rotational motion to the seed dispensing mechanism 74, thus causing the seed planting machine 70 to dispense seeds. Next Step 1104 includes travelling in a second direction using the seed planting machine 70 configured in the first configuration, such that the lockout clutch 10 does not transmit rotational motion to the seed dispensing mechanism 74, thus causing the seed planting machine 70 to not dispense seeds. In a next Step 1106, the actuator 18 of the lockout clutch 10 is disengaged, so as to configure the seed planting machine 70 in a second configuration. Upon disengaging the actuator 18 from the lockout clutch 10, the next Step 1108 includes travelling in the first direction using the seed planting machine 70 configured in the second configuration, such that the lockout clutch 10 does not transmit rotational motion to the seed dispensing mechanism 74, thus causing the seed planting machine 70 to not dispense seeds. A final Step 1110 includes travelling in the second direction using the seed planting machine 70 configured in the second configuration, such that the lockout clutch 10 does not transmit rotational motion to the seed dispensing mechanism 74, thus causing the seed planting machine 70 to not dispense seeds.

Such a method for selectively dispensing seed from a seed planting machine 70 may be advantageous for situations in which the soil needs to be tilled, aerated, or otherwise conditioned before seed is planted therein. For example, the seed planting machine 70 may be initially configured in the second configuration, such that the seed planting machine 70 will travel in the first direction without planting seed. As such, the seed planting machine 70 can travel over the soil such that the roller mechanisms (e.g., the tiller rollers, aerator rollers, packer rollers, disc harrows, etc.) of the seed planting machine 70 will condition the soil without the seed planting machine 70 planting seeds. Once the seed planting machine 70 has sufficiently conditioned the soil, the seed planting machine 70 can be configured in the first configuration, such that the seed planting machine 70 will plant seed when travelling in the first direction (e.g., forward). Nevertheless, regardless of whether the seed planting machine 70 is in the first or second configuration, the seed planting machine 70 will not dispense seed (i.e., will not have its seed dispensing mechanism 74 driven to rotate) when travelling in the second direction (e.g., reverse). As such, embodiments of the present invention prevent the seed dispensing mechanism 74 from being damaged when the seed planting machine 70 is driven in reverse.

In addition to the lockout clutch 10 being operable to selectively drive the seed dispensing mechanism 74, the lockout clutch 10 can similarly be configured to drive the seed mixing mechanism 80. In particular, drive component 82 of the seed mixing mechanism 80 may be linked, either directly or indirectly via the transmission system 78, with the lockout clutch 10. In particular, the transmission system 78 may link the driven sprocket 16 of the lockout clutch 10 with the drive component 82 of the seed mixing mechanism 80. However, it is understood that the drive component 82 and the lockout clutch 10 may not be directly linked, but instead, may be indirectly linked via one or more sprockets/sprocket assemblies and/or chains of the transmission system 78. Furthermore, in certain embodiments, such as illustrated in FIG. 9, it is contemplated that the drive component 82 of the seed mixing mechanism 80 may be linked with the drive component 86 of the seed dispensing mechanism 74. As such, when the seed dispensing mechanism 74 is caused to rotate, via the transmission system 78, such a rotation causes a simultaneous rotation of the seed mixing mechanism 80. Nevertheless, and regardless of how the seed mixing mechanism 80 and its drive component 82 are driven by the transmission system 78, with the lockout clutch 10 in the first configuration (i.e., the actuator 18 engaged with the catch plate 20), a rotation of the drive sprocket 14 in the first direction will cause a corresponding rotation of the driven sprocket 16 in the first direction. Contrastingly, a rotation of the drive sprocket 14 in the second direction will not cause a corresponding rotation of the driven sprocket 16 in the second direction. Because the driven sprocket 16 is linked, directly or indirectly, with the drive component 82 of the seed mixing mechanism 80, a rotation of the driven sprocket 16 will cause a corresponding rotation of the drive component of the mixing mechanism 80, and, thus, a corresponding mixing of seeds within the seed bin 72.

In other embodiments, the seed planting machine 70 will include two or more seed bins, with each operable to house seed. For instance, with reference to FIGS. 9-10, seed planting machine 70 may include a second seed bin 90. Furthermore, as illustrated by FIG. 10, the second seed bin 90 may include a mixing mechanism 92, similar to the mixing mechanism 80 associated with the originally-described seed bin 72. In some embodiments, the mixing mechanism 92 will be rotated via a drive component 94, such as a sprocket, pulley, or a gear, which is integrally connected with an end of the mixing mechanism. The drive component 94 is integrally connected to the mixing mechanism 92, such that a rotation of the drive component causes a corresponding rotation of the mixing mechanism 92. Also similar to the seed bin 72, the second seed bin 90 will be associated with a seed dispensing mechanism 96 generally positioned adjacent to a lower portion and/or below the second seed bin 90. In some embodiments, the seed dispensing mechanism 96 will be rotated via a drive component 98, which is integrally connected with an end of the seed dispensing mechanism 96. As such, the drive component 98 is integrally connected to the seed dispensing mechanism 96, such that a rotation of the drive component 98 causes a corresponding rotation of portions of the seed dispensing mechanism 96.

As such, embodiments of the present invention provide for planting a second type of seed from the seed planting machine 70. In particular, the seed planting machine 70 may hold a second type of seed located within the second seed bin 90. Similar to the method previously described with respect to selectively dispensing seed from the seed bin 72, the driven component 88 of the ground-engaging mechanism 76 may be linked with the lockout clutch 10 via a first chain. In particular, the first chain may be engaged with the drive sprocket 14 of the lockout clutch 10. Furthermore, the drive component 98 of the seed dispensing mechanism 96 of the second seed bin 90 may be linked with the lockout clutch 10 directly or indirectly via a one or more additional chains and sprockets/sprocket assemblies of the transmission system 78. In particular, a second chain may be directly engaged between the driven sprocket 16 of the lockout clutch 10 and the drive component 98 of the seed dispensing mechanism 96. However, it is understood that in certain embodiments, such as shown in FIGS. 9-10, the drive component 98 and the lockout clutch 10 may not be directly linked, but instead, may be indirectly linked via one or more sprockets/sprocket assemblies and/or chains of the transmission system 78.

Nevertheless, a rotation of the ground-engaging mechanism 76 will cause a corresponding rotation of the driven component 88, which will cause the first chain to translate, thereby causing a corresponding rotation of the drive sprocket 14 of the lockout clutch 10. As previously described, with the lockout clutch in the first configuration (i.e., the actuator 18 engaged with the catch plate 20), a rotation of the drive sprocket 14 in the first direction will cause a corresponding rotation of the driven sprocket 16 in the first direction. Contrastingly, a rotation of the drive sprocket 14 in the second direction will not cause a corresponding rotation of the driven sprocket 16 in the second direction. Because the driven sprocket 16 is linked with the drive component 98 of the seed dispensing mechanism 96, either directly or indirectly, a rotation of the driven sprocket 16 will cause a corresponding rotation of the seed dispensing mechanism 96 and, thus, will result in the seed planting machine 70 dispensing seed from the second seed bin 90.

In view of the above, and particularly with the lockout clutch 10 in the first configuration, when the seed planting machine 70 travels in a first direction, the ground-engaging mechanism 76 will rotate in the first direction. As a result, the driven component 88 of the ground-engaging mechanism, the first chain, the drive sprocket 14 of the lockout clutch 10, the driven sprocket 16 of the lockout clutch, portions of the transmission system 78, and the drive component 98 of the seed dispensing mechanism 96 associated with the second seed bin 90 will all rotate in the first direction. The end result being that the seed dispensing mechanism 96 will rotate and dispense seed from the second seed bin 90. Contrastingly, when the seed planting machine 70 travels in the second direction, the ground-engaging mechanism 76 will rotate in the second direction. As a result, only the driven component 88 of the ground-engaging mechanism, the first chain, and the drive sprocket 14 of the lockout clutch 10 will rotate in the second direction. The driven sprocket 16, the transmission system 78, the drive component 98, and the seed dispensing mechanism 96 associated with the second seed bin 90 will not be caused to rotate. The end result being that the seed dispensing mechanism 96 will not dispense seeds from the second seed bin 90 of the seed planting machine 70.

With the lockout clutch 10 in the second configuration, the actuator 18 is not engaged with the catch plate 20, such that the driven sprocket 16 will not be caused to rotate in response to the drive sprocket 14 being rotated in either the first or second direction. As such, when the seed planting machine 70 travels in either the first or second directions, the ground-engaging mechanism 76 will rotate in the first or second directions, respectively, but only the driven component 88 of the ground-engaging mechanism 76, the first chain, and the drive sprocket 14 of the lockout clutch 10 will be correspondingly caused to rotate in the first or second directions. The driven sprocket 16, the drive component 98, and the seed dispensing mechanism 96 associated with the second bin 90 will not be caused to rotate. The end result being that the seed dispensing mechanism 96 will not dispense seeds from the second seed bin 90. Thus, when the seed planting machine 70 travels forward or reverse, it is not operable to dispense seeds from the second seed bin 90.

In addition to the lockout clutch 10 being operable to selectively drive the seed dispensing mechanism 96 associated with the second seed bin 90, the lockout clutch can similarly be configured to drive the seed mixing mechanism 92 associated with the second seed bin. In particular, drive component 94 of the seed mixing mechanism 92 may be linked, either directly or indirectly via the transmission system 78, with the lockout clutch 10. In particular, the transmission system 78 may link the driven sprocket 16 of the lockout clutch 10 with the drive component 94 of the seed mixing mechanism 92. However, it is understood that the drive component 94 and the lockout clutch 10 may not be directly linked, but instead, may be indirectly linked via one or more sprockets/sprocket assemblies and/or chains of the transmission system 78. Furthermore, in certain embodiments, such as illustrated in FIG. 9, it is contemplated that the drive component 94 of the seed mixing mechanism 92 may be linked with the drive component 98 of the seed dispensing mechanism 96. As such, when the seed dispensing mechanism 96 and the drive component 98 are caused to rotate, via the transmission system 78, such a rotation causes a simultaneous rotation of the seed mixing mechanism 92. Nevertheless, and regardless of how the seed mixing mechanism 92 and its drive component 94 are driven by the transmission system 78, with the lockout clutch 10 in the first configuration (i.e., the actuator 18 engaged with the catch plate 20), a rotation of the drive sprocket 14 in the first direction will cause a corresponding rotation of the driven sprocket 16 in the first direction. Contrastingly, a rotation of the drive sprocket 14 in the second direction will not cause a corresponding rotation of the driven sprocket 16 in the second direction. Because the driven sprocket 16 is linked, directly or indirectly, with the drive component 94 of the seed mixing mechanism 92, a rotation of the driven sprocket 16 will cause a corresponding rotation of the drive component 94 of the mixing mechanism, and, thus, a corresponding mixing of seeds within the second seed bin 90.

In certain embodiments, the transmission system 78 will include one or more drive components in the form of locking sprocket assemblies. Such locking sprocket assemblies will each broadly comprise two sprockets, including a first and a second sprocket, axially aligned so as to rotate about a common axle. Each locking sprocket assembly may include a retractable pin operable to couple the first and second sprockets. As such, with the pin engaged and the first and second sprockets coupled together, a rotation of the first sprocket, in either direction, will cause a corresponding rotation of the second sprocket. Similarly, a rotation of the second sprocket, in either direction, will cause a corresponding rotation of the first sprocket. However, with the pin not-engaged, the first and second sprockets will be decoupled, such that the first and second sprockets rotate independently.

The transmission system 78 may include a locking sprocket assembly associated with each seed bin 72, 90. For instance, with reference to the embodiments illustrated in FIGS. 9-10, the transmission system 78 may include a first locking sprocket 110 associated with seed dispensing mechanism 74. In particular, the first locking sprocket 110, with the pin of the locking sprocket engaged so as to couple the first and second sprockets together, is operable to transmit rotation from the transmission system 78 to the seed dispensing mechanism 74 of the seed bin 72. Alternatively, with the pin of the first locking sprocket 110 not engaged, the locking sprocket 110 is operable to not transmit rotation from the transmission system 78 to the seed dispensing mechanism 74 of the seed bin 72.

Similarly, embodiments of the present invention provide for the transmission system 78 to include a second locking sprocket 112 associated with the seed dispensing mechanism 96 of the second seed bin 90. The second locking sprocket 112, with the pin of the locking sprocket 112 engaged so as to couple the first and second sprockets together, is operable to transmit rotation from the transmission system 78 to the seed dispensing mechanism 96 of the second seed bin 90. Alternatively, with the pin of the second locking sprocket 112 not engaged, the locking sprocket 112 is operable to not transmit rotation from the transmission system 78 to the seed dispensing mechanism 96 of the second seed bin 90.

As such, in addition to the first and second configurations discussed above, the seed planting machine 70 is operable to be configured in a third and a fourth configuration. In particular, with the pin of the first locking sprocket 110 engaged and the pin of the second locking sprocket 112 not engaged, the seed dispensing machine is capable of being configured in the first or second configurations, as previously described, by engaging or disengaging the actuator 18 of the lockout clutch 10, respectively. As such, the seed planting machine 70 will selectively dispense seed from the seed bin 72, as previously described. Furthermore, however, with the pin of the first locking sprocket 110 engaged and the pin of the second locking sprocket 112 engaged, the seed planting machine 70 is capable of being configured in a third configuration. In such a configuration, the seed planting machine 70 is operable to selectively dispense seed from both the seed bin 72 and the second seed bin 90 simultaneously. Finally, with the pin of the first locking sprocket 110 not engaged and the pin of the second locking sprocket 112 engaged, the seed dispensing machine 70 is capable of being configured in a fourth configuration. In such a configuration, the seed planting machine 70 is operable to selectively dispense seed from only the second seed bin 90.

Although the invention has been described with reference to the exemplary embodiments illustrated in the attached drawings, it is noted that equivalents may be employed and substitutions made herein without departing from the scope of the invention as recited in the claims. For example, although the above description and drawings describe the lockout clutch 10 being positioned on the seed planting machine 70 at a position set apart from the ground-engaging roller mechanism 76 and from the seed dispensing mechanism 74, it is understood that that the lockout clutch 10 can be positioned at other locations or can replace other components of the seed planting machine. For example, in certain embodiments, the lockout clutch 10 may be positioned on the end of the ground-engaging roller mechanism 76 in place of the driven component 88. Alternatively, the lockout clutch 10 may be positioned on the ends of either/both of the seed dispensing mechanisms 74, 96 in place of the drive components 86, 98. In even further alternatives, the lockout clutch 10 may be positioned on the ends of either/both of the mixing mechanisms 80, 92 in place of the drive components 82, 94. Furthermore, embodiments of the present invention may provide for the seed planting machine 70 to include a plurality of lockout clutches 10 positioned at various locations on the machine.

As an additional example of an alternative embodiment of the present invention, in certain instances, the transmission system 78 may be driven by power sources other than the ground-engaging roller mechanism 76. For example, in certain instances, the seed planting machine 70 may include a hydraulic power system, an electrical power system, or a power take-off system. In certain embodiments, these other power systems may be coupled with the driven component 88, such that the lockout clutch 10 and the transmission system 78 may be selectively driven by such other power systems.

What is claimed is:
1. A seed planting machine comprising:
  a seed bin;
  a rotatable seed dispensing mechanism for dispensing seed from said seed bin;
  a ground-engaging roller mechanism; and
  a chain drive transmission system for selectively transmitting rotation from said ground-engaging roller mechanism to said seed dispensing mechanism, wherein said chain drive transmission system includes a lockout clutch comprising an actuator for shifting said lockout clutch between a first configuration and a second configuration, wherein said lockout clutch, in said first configuration, is operable to drive said seed dispensing mechanism in response to said roller mechanism rotating in a first direction, and is not operable to drive said seed dispensing mechanism in response to said roller mechanism rotating in a second direction, wherein said lockout clutch, in said second configuration, is not operable to drive said seed dispensing mechanism in response to said roller mechanism rotating in the first direction, and is not operable to drive said seed dispensing mechanism in response to said roller mechanism rotating in said second direction.

2. The seed planting machine of claim 1, wherein said lockout clutch is positioned on said seed planting machine at a location generally set apart from said roller mechanism and from said seed dispensing mechanism.

3. The seed planting machine of claim 2, wherein said roller mechanism includes a driven component positioned adjacent to an end of said roller mechanism, wherein a rotation of said roller mechanism is operable to cause a corresponding rotation of said driven component, and wherein said seed planting machine includes a drive chain engaging said driven component and said lockout clutch.

4. The seed planting machine of claim 3, wherein said seed dispensing mechanism includes a drive component positioned adjacent to said seed dispensing mechanism, wherein said drive component is operable to transmit rotary motion from the transmission system to the seed dispensing mechanism, and wherein said drive component and said driven component are sprockets.

5. The seed planting machine of claim 1, wherein said transmission system includes a locking sprocket associated with said seed dispensing mechanism, and wherein said locking sprocket is operable to selectively transmit rotation from said lockout clutch to said seed dispensing mechanism.

6. The seed planting machine of claim 1, wherein said lockout clutch further includes— a drive sprocket and a driven sprocket; and
a catch plate positioned between said drive sprocket and said driven sprocket,
wherein said actuator is operable to selectively engage with said catch plate.

7. The seed planting machine of claim 6, wherein with said actuator engaged with said catch plate said lockout clutch is in said first configuration, and with said actuator not engaged with said catch plate said lockout clutch is in said second configuration.

8. The seed planting machine of claim 7, wherein with said actuator not engaged with said catch plate said actuator remains engaged with at least a portion of said lockout clutch.

9. The seed planting machine of claim 1, wherein said roller mechanism is selected from one of the following: a spiked roller assembly, a tiller roller assembly, and one or more wheels of the seed planting machine.

10. The seed planting machine of claim 1, wherein said seed dispensing mechanism comprises one or more of the following: a fluted roller, a metering belt, a metering disc, a metering auger, and a metering sprocket.

11. The seed planting machine of claim 1, wherein said seed planting machine further comprises a rotatable seed mixing mechanism for mixing seed within said seed bin.

12. The seed planting machine of claim 11, wherein said lockout clutch, in said first configuration, is operable to drive said seed mixing mechanism in response to said roller mechanism rotating in a first direction, and is not operable to drive said seed mixing mechanism in response to said roller mechanism rotating in a second direction, and wherein said lockout clutch, in said second configuration, is not operable to drive said seed mixing mechanism in response to said roller mechanism rotating in the first direction, and is not operable to drive said seed mixing mechanism in response to said roller mechanism rotating in said second direction.

13. The seed planting machine of claim 12, wherein said seed mixing mechanism comprises a paddle wheel or a paddle agitator.

* * * * *